US007067025B2

(12) United States Patent
Borgeat

(10) Patent No.: US 7,067,025 B2
(45) Date of Patent: Jun. 27, 2006

(54) MACHINE FOR THE PRODUCTION OF AIR PILLOWS USED FOR PACKAGING BY MEANS OF A TUBULAR FILM DISPOSED ON A REEL

(76) Inventor: Guy Borgeat, Chalet Les Echos, CH-1874, Champery (CH)

(*) Notice: Subject to any disclaimer, the term of this patent is extended or adjusted under 35 U.S.C. 154(b) by 0 days.

(21) Appl. No.: 10/501,157

(22) PCT Filed: Jan. 14, 2003

(86) PCT No.: PCT/CH03/00015

§ 371 (c)(1),
(2), (4) Date: Jul. 12, 2004

(87) PCT Pub. No.: WO03/059609

PCT Pub. Date: Jul. 24, 2003

(65) Prior Publication Data

US 2005/0077004 A1 Apr. 14, 2005

(30) Foreign Application Priority Data

Jan. 17, 2002 (FR) ........................................ 73/02

(51) Int. Cl.
*B32B 31/20* (2006.01)

(52) U.S. Cl. ........................ 156/64; 156/285; 156/292; 156/513; 156/515; 156/583.1; 53/403

(58) Field of Classification Search ................ 156/359, 156/358, 361, 513, 515, 583.1, 64, 205, 292; 53/403, 79, 80–110; 493/193, 194
See application file for complete search history.

(56) References Cited

U.S. PATENT DOCUMENTS 3,938,298 A * 2/1976 Luhman et al. ............... 53/403

FOREIGN PATENT DOCUMENTS

WO WO 9961232 A 12/1999

* cited by examiner

*Primary Examiner*—George Koch
(74) *Attorney, Agent, or Firm*—David A. Guerra

(57) ABSTRACT

This machine comprises a frame, spacing means arranged in the interior (3) of the tubular film (1) to separate the walls, traction means (8) to draw the tubular film and an inflating and welding device (5, 6, 7, 12). The inflating and welding means is provided with at least one hollow needle (5) for inflation, means (2, 2*a,* and 2*b*) to prevent the air escaping toward said reel, that is to say, upstream. Said means (2) to prevent the escape of air are placed between the means (3) provided within the said film and the reel. The inflating and welding device (5, 6, 7, 12) is located after the means (3) provided within said film and before the traction means (8) for drawing said tubular film (1) through the inflating and welding device. The hollow needle (5) of the inflating and welding device is attached to a first beam (12) located on one side of the said film and controlled by a first actuator (13) and two heating elements (6) located upstream and downstream of the hollow needle attached to a second beam (10) located on the other side of said film controlled by a second actuator (11). The means for preventing the air introduced into the tubular film from escaping towards the said reel, that is to say, upstream, comprise an elongate element (2*b*) extending in a transverse direction relative to the film (1) attached to said first beam (12) in such a way as to be held away from said film during the movement of the latter and being introduced into a recess (2*a*) provided in a plate (2) on the frame of the machine to force said film into the recess to form a sealed fold in the latter.

16 Claims, 2 Drawing Sheets

Figure 1:
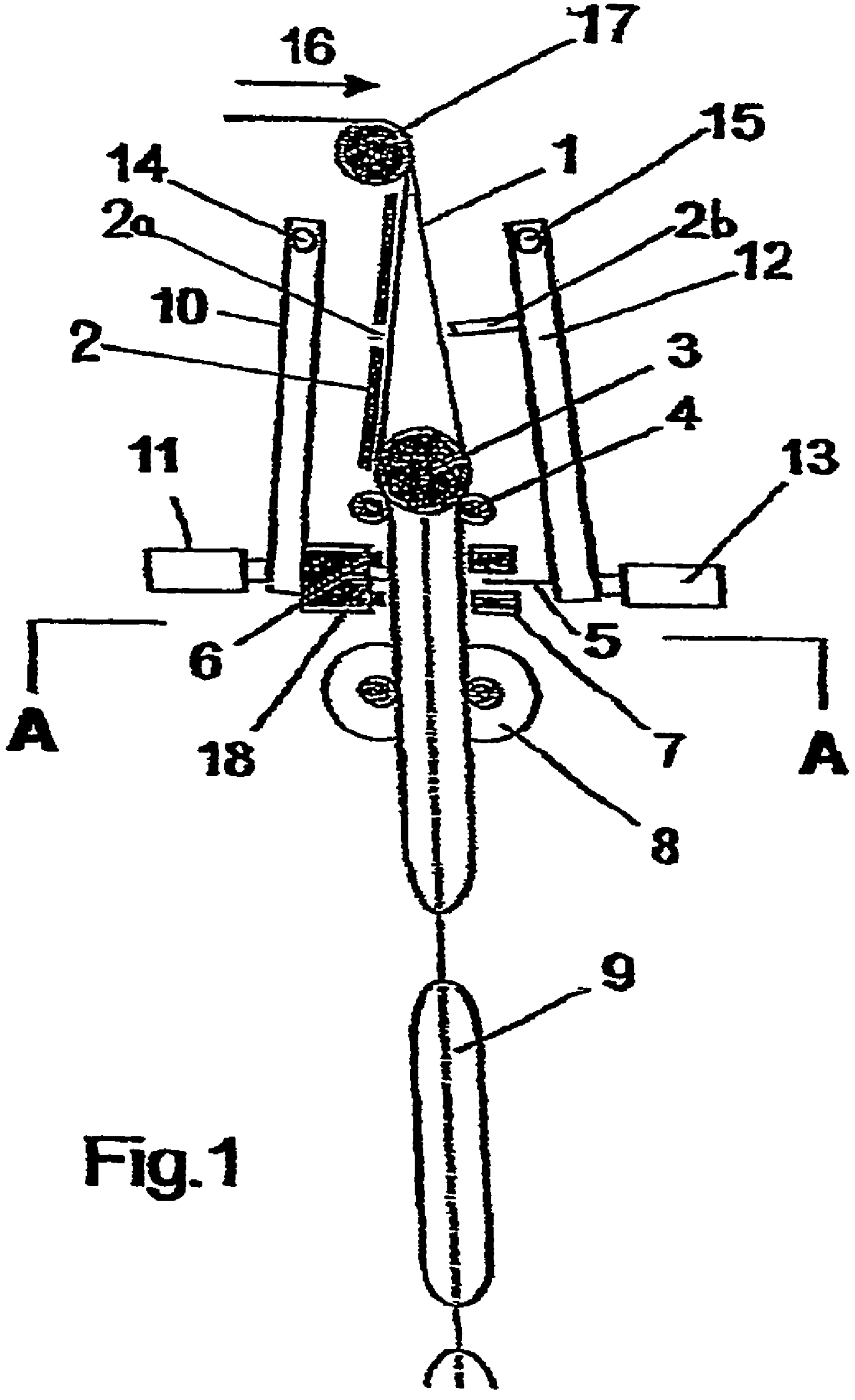

MACHINE FOR THE PRODUCTION OF AIR PILLOWS USED FOR PACKAGING BY MEANS OF A TUBULAR FILM DISPOSED ON A REEL

This application is a 371 of PCT/CH03/00015, filed on Jan. 14th, 2003.

The present invention has for an object a machine for making air cushions for packaging from a tubular film wound on a reel, notably for cushioning delicate and fragile objects.

The document WO 99/61232 contains a history of the improvements made to the types of machine which form the subject of the present invention and defines a machine for making air cushions for packaging which do not exhibit the defects of the prior art. However, the machine defined in document WO 99/61232 still has some problems, particularly in relation to the tension of the tubular film intended for making the air cushions. This tension is very important for allowing good perforation of the film and hence a standard filling of the cushions.

The invention has for an object to provide a machine intended for the manufacture of air cushions for packaging which represents a marked improvement over the known machines, particularly in respect of the tension of the film, so as to ensure reliable operation of the machine in respect of both quality and durability.

These goals are achieved with the machine for making air cushions for packaging from tubular film wound on a reel in accordance with the invention, said machine comprising a frame, spacing means arranged within said tubular film to separate the walls, traction means to draw the tubular film and an inflating and welding device having at least one hollow needle for inflation, means to prevent the air escaping toward said reel, that is to say, upstream, said means to prevent the escape of air being placed between the means provided within the said film and the reel, the inflating and welding device being placed after the means provided within said film and before the means for drawing said film to pull the tubular film through the inflating and welding device, the hollow needle of the inflating and welding device being attached to a first beam located on one side of the said film controlled by a first actuator and two heating elements located upstream and downstream of the hollow needle on a second beam located on the other side of said film controlled by a second actuator, characterized in that the means for preventing the air introduced into the tubular film from escaping towards the said reel, that is to say, upstream, comprise an elongated element extending in a transverse direction relative to the film attached to said first beam in such a way as to be held away from said film during the movement of the latter and being introduced into a recess provided in a plate in the frame of the machine to force said film into the recess to form a sealed fold in the latter.

Figure 2:
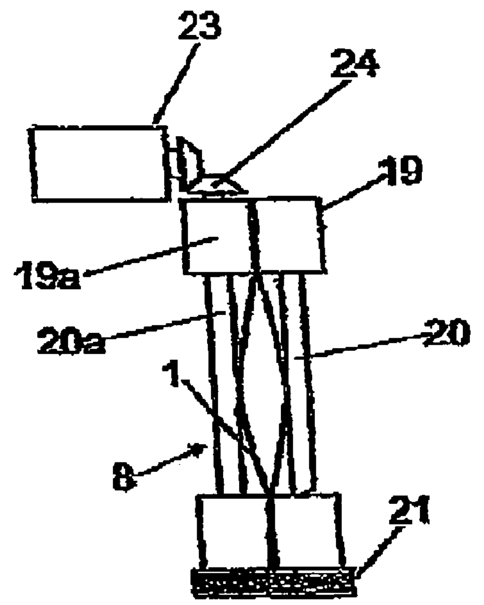

The invention will be better understood and its advantages will appear more clearly from a reading of the description of the method of carrying the invention into effect, which is given solely by way of example, and by means of the drawings in which:

FIG. 1 represents a schematic view of a machine in accordance with the invention, FIG. 2 shows the section A—A of FIG. 1 showing the traction device as seen from above, FIGS. 3*a, b* and *c* provide a diagrammatic representation of the different phases of operation of the machine shown in FIG. 1.

As can be seen from the schematic view of FIG. 1, one embodiment of the machine in accordance with the invention includes means 8 to draw the tubular film 1, which can be of any material which can be welded by thermal welding, for example, plastic. The film is pulled in the direction of the arrow 16 from a reel, which is not shown. The film 1 first passes over a return roller 17 which displaces it vertically on the drawing, then it passes in front of a plate 2 on the frame comprising a recess 2*a*. The recess 2*a* in the plate 2 is arranged opposite an elongate element 2*b* attached to a first beam 12. The tubular film 1 then encounters a body 3 introduced into the interior of the tubular film 1 through the opening at the end of the film 1 at the time when the machine is first started up. The body 3 rests on two bars or rods 4 disposed outside said film 1 and separated by a distance less than the external diameter of the body 3. The body 3 is, for example, a cylinder of plastic material of about 1 cm in diameter, held in place solely by gravity on the two rods 4. Just after its passage around the body 3 the film 1 passes through the inflating and welding device.

The inflating and welding device comprises at least one hollow needle 5 connected to inflating means (for example, a compressor, not shown) and fixed to a first beam 12 articulated on an axis 15 and thermal pressure welding means 6 attached to a second beam 10 articulated on an axis 14.

The oscillating movement of the beam 12 is controlled by a first actuator 13 and the oscillating movement of the beam 10 by a second actuator 11.

The welding means 6 consist of two heating bars (for example, using thermal resistance) disposed one above the other, of a length at least equal to the width of the tubular film 1 and placed on one side of said film opposite thrust bars 7 placed one above the other on the opposite side, the hollow needle 5 being arranged between thrust bars 7. The inflating and welding device also comprises points or a serrated knife 18 between the heating bars to perforate or partially cut the tubular film 1 in order to facilitate its separation.

In FIG. 2 the film traction device 8 comprises two cylinders 19, 19*a* each having ends of greater diameter than that of their central parts 20, 20*a*. The terminal parts of the cylinders 19, 19*a* are coated with flexible and elastic material, for example, foam rubber. Cylinders 19, 19*a* are in contact with one another at their extremities leaving in their central part a space such that the two walls of the tubular film 1 can remain separated after inflation. The two cylinders are caused to rotate by a motor 23 by means of gears 24 and 21.

Figure 3:
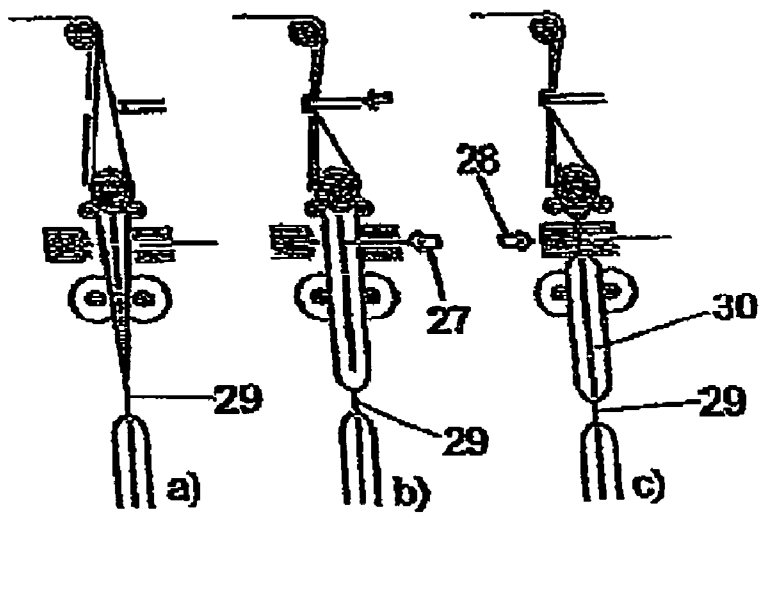

The operation of the machine will be explained with the aid of FIGS. 3*a*, 3*b* and 3*c*. The elements represented are the same as those of FIG. 1; the reference symbols have not been repeated in order not to obscure the drawings. First, the body 3 is introduced through the opening of the end of the said tubular film into the interior of the latter and the film is drawn between the bars 4, then through the driving means 8. The welding device 6, 7 is then operated so as to close the end of the tubular film 1 by means of a weld 29 (FIG. 3). The machine is ready to operate, as shown in FIG. 3*a*. The actuator 13 operates the beam 12 so as to displace the element 2*b* in the direction of the arrow 31 which enters into the recess 2*a* in the plate 2 of the frame of the machine. The element 2*b* comprises a strip having a thickness substantially less than the opening of the recess 2*a* so that the strip can introduce the two walls of the tube 1 into the recess 2*a*. When the film 1 is introduced into the recess 2*a* it creates a tension on the latter. In effect, the film 1 is retained on the roller 17 and in the traction device 8, this tension improves the separation of the two walls of the tubular film 1.

Immediately after the element 2*b* has been introduced into the recess 2*a,* the needle 5 is introduced in the direction of the arrow 27 (FIG. 3*b*) into the tubular film 1 by the movement of the beam 12 effected by the actuator 13, penetrating only one wall because the region where it is introduced is immediately after the body 3 and walls of the tubular film have been well separated. Inflation is then effected, air being retained by the weld 29 and by the fold formed in the recess 2*a* in the plate 2 by the element 2*b*.

Welding is then effected, the welding bars 6 being displaced in the direction of the arrow 28 (FIG. 3*c*) by the beam 10 moved by the actuator 11 so as to come to rest on the thrust bars 7 pinching the tubular film between them and the thrust bars. Welding can then take place. The welding bars are then heated in order to effect sealing of the two walls of the tubular film to form a cushion 30. During the welding, the needle 5 and the element 2*b* are withdrawn rearwards by a reverse movement of the beam 12 effected by the actuator 13. The welding bars are then withdrawn rearwards by a reverse movement of the beam 10 effected by the actuator 11. The cushion 30 is then pulled on its sides by cylinders 8 as indicated in FIG. 2 for a distance equal to the length of a cushion.

The cycle described above can then restart because it is again in the position shown in FIG. 3*a*.

It is to be understood that the description of the method of carrying the invention into effect given above is provided only by way of example. Thus all the variations relating to the shape of the element intended to enter the recess to hold the film are comprised within the scope of the present invention.

The invention claimed is:

1. An air cushion manufacturing system for making an air cushion packaging from tubular film, comprising:
- a frame having a plate, a first beam, and a second beam, said plate defining a recess in said plate, said first and second beam being articulated mounted to said frame and orientated so that said tubular film passes therebetween;
- an elongated element attachable to said first beam and adapted to be received through said recess in said plate thereby creating tension on said tubular film;
- a body positioned adjacent said elongated element and between said first and second beams, said body adapted to be inserted into the interior of said tubular film;
- an inflating device having at least one hollow needle connected to an inflating means, said inflating device being attachable to said first beam past said two bars of said body;
- a welding device attachable to said second beam;
- a first actuator attachable to said first beam for providing an oscillating movement to said first beam;
- a second actuator attachable to said second beam for providing an oscillating movement to said second beam; and
- a film traction device in contact with said tubular film.

2. The air cushion manufacturing system as set forth in claim 1, wherein said body rests on two bars disposed outside said tubular film, said bars being separated by a distance less than the external diameter of the body.

3. The air cushion manufacturing system as set forth in claim 1, wherein said inflating means is a fluid compressor.

4. The air cushion manufacturing system as set forth in claim 1, wherein said welding device having at least one heating bar disposed one above the other.

5. The air cushion manufacturing system as set forth in claim 4 further comprising at least two thrust bars disposed one above the other and positioned opposite said heating bars of said welding device with said tubular film passing therebetween, said thrust bars being oriented so as to allow said hollow needle of said inflating device to pass therebetween.

6. The air cushion manufacturing system as set forth in claim 1 further comprising a serrated knife attachable to said second beam adjacent said welding device.

7. The air cushion manufacturing system as set forth in claim 4 further comprising a serrated knife attachable to said second beam and located between said heating bars of said welding device.

8. The air cushion manufacturing system as set forth in claim 1, wherein said film traction device having at least two cylinders, and a motor and gear assembly for providing rotational motion to said cylinders.

9. The air cushion manufacturing system as set forth in claim 8, wherein said cylinders are coated with a flexible and elastic material.

10. The air cushion manufacturing system as set forth in claim 9, wherein said flexible and elastic material is foam rubber.

11. An air cushion manufacturing system for making an air cushion packaging from tubular film, comprising:
- a frame having a plate, a first beam, and a second beam, said plate defining a recess in said plate, said first and second beam being articulated mounted to said frame and orientated so that said tubular film passes therebetween;
- an elongated element attachable to said first beam and adapted to be received through said recess in said plate thereby creating tension on said tubular film;
- a body positioned adjacent said elongated element and between said first and second beams, said body adapted to be inserted into the interior of said tubular film, said body rests on two bars disposed outside said tubular film, said bars being separated by a distance less than the external diameter of the body;
- an inflating device having at least one hollow needle connected to an inflating means, said inflating device being attachable to said first beam past said two bars of said body;
- a welding device attachable to said second beam past said two bars of said body, said welding device having at least two heating bars disposed one above the other;
- a first actuator attachable to said first beam for providing an oscillating movement to said first beam;
- a second actuator attachable to said second beam for providing an oscillating movement to said second beam;
- at least one thrust bar disposed one above the other and positioned opposite said heating bars of said welding device with said tubular film passing therebetween, said thrust bars being oriented so as to allow said hollow needle of said inflating device to pass therebetween;
- a serrated knife located between said heating bars of said welding device; and
- a film traction device having at least two cylinders and a motor and gear assembly for providing rotational motion to said cylinders.

12. The air cushion manufacturing system as set forth in claim 11, wherein said inflating means is a compressor.

13. The air cushion manufacturing system as set forth in claim 11, wherein said cylinders of said traction device having ends of greater diameter than that of their central part thereby said cylinders being in contact with each other at their extremities and defining a space in their central part for the two walls of said tubular film to remain separated after inflation.

14. The air cushion manufacturing system as set forth in claim 13, wherein said cylinders are coated with a flexible and elastic material.

15. The air cushion manufacturing system as set forth in claim 14, wherein said flexible and elastic material is foam rubber.

16. A method of making an air cushion for packaging from a tubular film having two walls, said method comprising the steps of:

a step of providing an apparatus, said apparatus comprising a frame having a plate, a first beam, and a second beam, said plate defining a recess in said plate, said first and second beam being articulated mounted to said frame and orientated so that said tubular film passes therebetween; an elongated element attachable to said first beam and adapted to be received through said recess in said plate thereby creating tension on said tubular film; a body positioned adjacent said elongated element and between said first and second beams, said body adapted to be inserted into the interior of said tubular film; an inflating device having at least one hollow needle connected to an inflating means, said inflating device being attachable to said first beam past said two bars of said body; a welding device attachable to said second beam; a first actuator attachable to said first beam for providing an oscillating movement to said first beam; a second actuator attachable to said second beam for providing an oscillating movement to said second beam; and a film traction device in contact with said tubular film;

introducing said body through an opening located in an end of said film and into the interior of said film;

drawing said film between two bars located on said body, then through a driving means;

welding said end of said film;

oscillating said first beam by way of said first actuator so as to displace said elongated element to enter said recess defined in said plate located opposite said first beam;

introducing said two walls of said film into said recess of said plate by way of a strip attached to said elongated element thereby creating tension on said film;

retaining said film on a roller and said traction device for creating more tension and thereby improving the separation of said two wells of said film;

introducing said hollow needle into said film by the oscillating movement of said first beam, said needle penetrating only one wall of said two walls of said film;

inflating said film, whereby fluid being retained by said welded ends of said film;

withdrawing said hollow needle rearward by a reverse movement of said first beam;

sealing said two wall of said film by way of said welding device located on said second beam opposite said first beam, said welding occurs by oscillating said second beam by way of said second actuator so as to displace at least two welding bars located on said welding device so as to come to rest on at least two thrust bars located on said first beam thereby pinching said tubular film therebetween;

welding said two walls of said tubular film by heating said welding bars to seal said two walls of said film to form a cushion;

withdrawing said welding bars of said welding device by a reverse movement of said second beam; and pulling said cushion by way of said traction device for a distance equal to the length of said cushion.

* * * * *